W. H. GREEN.
AUTOMOBILE WHEEL ATTACHMENT.
APPLICATION FILED MAY 4, 1921.
1,417,821.
Patented May 30, 1922.
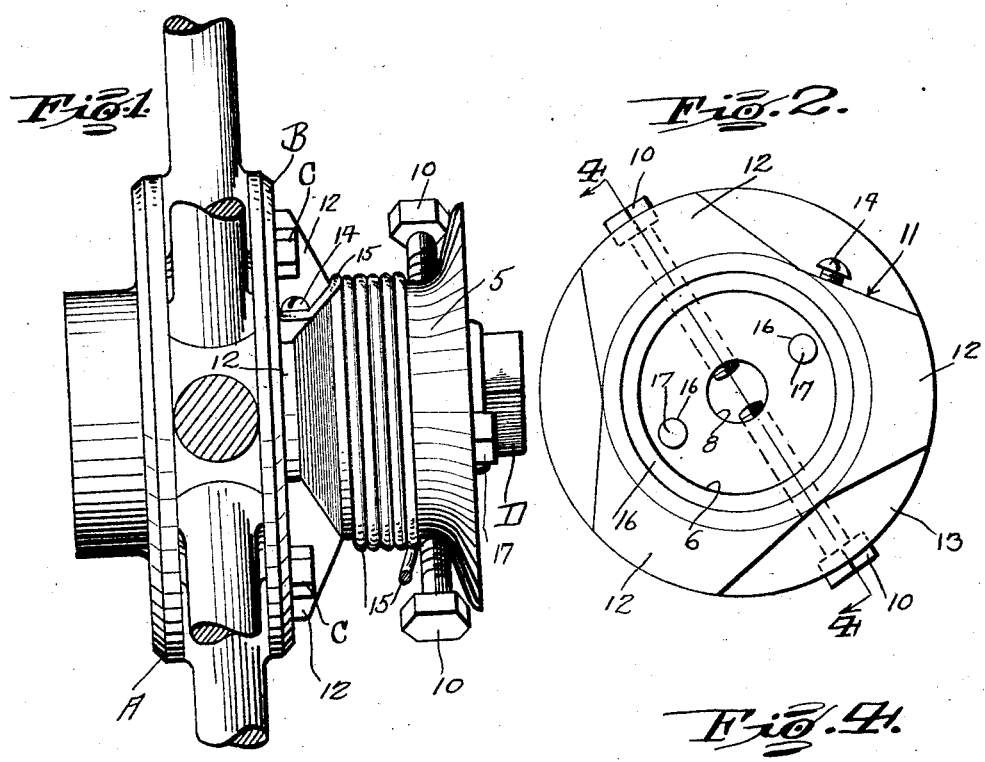
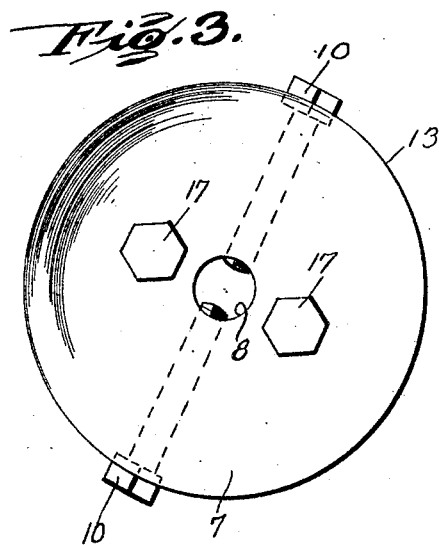
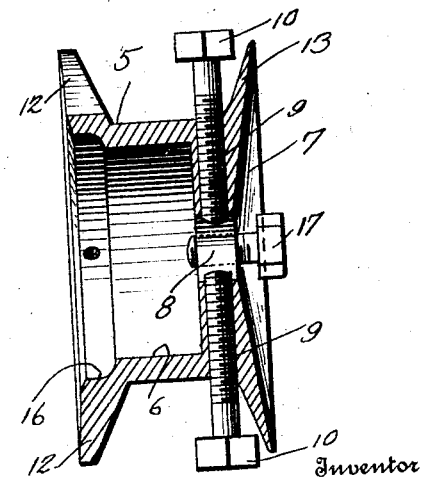
Inventor
W. H. Green.
By Watson E. Coleman, Attorney

UNITED STATES PATENT OFFICE.

WALTER H. GREEN, OF DARDANELLE, ARKANSAS.

AUTOMOBILE WHEEL ATTACHMENT.

1,417,821.

Specification of Letters Patent. Patented May 30, 1922.

Application filed May 4, 1921. Serial No. 466,795.

*To all whom it may concern:*

Be it known that I, WALTER H. GREEN, a citizen of the United States, residing at Dardanelle, in the county of Yell and State of Arkansas, have invented certain new and useful Improvements in Automobile Wheel Attachments, of which the following is a specification, reference being had to the accompanying drawings.

This invention relates to automobile wheel attachments, and more particularly to an attachment in the form of a combined hub and pulley.

It is an object of the invention to provide a device of this character capable of being applied to the wheel to serve as an auxiliary hub in case the hub of the wheel becomes damaged or broken, so as to maintain the wheel in its proper position on the axle.

It is also an object of the invention to provide a device of this character which not only serves as an auxiliary hub, but wherein the periphery of the device is formed into a pulley adapted to receive a cable to assist in extracting an automobile from a ditch or rut.

It is a further object of the invention to provide a device of this character wherein portions of one of the flanges of the pulley are cut away to provide feet adapted to extend between nuts or securing means of the wheel to prevent accidental rotation of the device on the wheel.

It is a further object of the invention to provide a device of this character wherein means are not only provided for securing the auxiliary hub to the main hub, but wherein means are also provided for securing the hub to the axle.

With these and other objects in view the invention consists in the improved construction and arrangement of parts to be hereinafter more particularly described, fully claimed and illustrated in the accompanying drawings in which:

Figure 1 is a fragmentary view of a wheel showing the invention applied,

Figure 2 is a side elevation of the hub and pulley detached,

Figure 3 is a side elevation of the hub and pulley taken from the opposite side of the structure shown in Figure 2, Figure 4 is a sectional view taken on the line 4—4 of Figure 2.

Referring to the drawings, A designates a conventional form of automobile wheel including the hub member B and the spoke fastening bolts C.

Should the hub member become damaged so as to interfere with the connection of the wheel to the axle, there is provided novel means for strengthening the wheel and for securing the same to the axle to permit its operation in the usual manner. This means consists of a body member 5 having a socket 6 formed therein for the reception of the hub member B, the edge of said socket being enlarged to permit the member 5 to snugly engage the surface of the wheel. The end 7 of the body member is provided with an opening 8 considerably smaller in diameter than the open end of the body member, said opening being adapted to receive the end of the axle D. A pair of opposed openings 9 are provided in the body member 5, said openings extending through the end 7 and terminating at the opening 8. Set screws 10 are threaded in said openings and are adapted to extend into the opening 8 and engage the key way of the axle. It is of course obvious that the thickness of the end 7 of the body member is sufficient to prevent the set screws 10 from projecting on either side of the end so that they do not interfere with the other fastening features or parts of the device.

The end 6 of the body member 5 is provided with a flange 11 which is cut away at several points to provide feet 12. Each foot is adapted to extend between certain of the bolts C of the wheel A to assist in preventing accidental rotation, as well as properly positioning the device on the wheel. It will be noted that the feet 12 taper from the edge thereof inwardly toward the periphery of the body member 5. This permits the feet to be readily extended between the nuts of the wheel and also causes the feet to act as guides in a manner to be hereinafter described.

Projecting from the end 7 and formed integral with said end is an annular flange 13, said flange projecting beyond the periphery of the body member 5 and forming one side portion of a pulley. The other side portion of the pulley is formed by the feet 12, the periphery of the body member 5 serving as the bottom of the channel of the pulley. A set screw 14 is disposed between a pair of the feet 12 and is adapted to receive one end of a cable 15.

In order to provide additional securing means for the device, a pair of threaded openings 16 are provided in the end 7 and are intended to receive set screws 17 which are adapted to engage the hub, or broken portion of the hub, when the device is used as an auxiliary hub. In the latter case, the screws 10 take the place of the broken key in the hub, while the wheel securing nut D is threaded on the end of the axle into engagement with the end 7 so as to urge the device toward the hub of the wheel. In view of this novel structure, the body member 5 is provided with four means of securing the same to the wheel, namely, the feet 12 disposed between the bolt C of the wheel, the set screws 10, the set screws 17, and the securing nut D of the axle, so that slipping or accidental disengagement is impossible. When the device is used to extract an automobile from a rut or depression, one end of the cable 15 is attached to a tree or like adjacent object and the automobile started, whereupon the cable will be guided and wound upon the pulley through the cooperation of the flange 13 and feet 12.

From the foregoing it will be readily seen that this invention provides a novel form of auxiliary hub member and pulley, which is compact in form, may be readily carried within the tool box of the automobile, and is capable of extracting an automobile from a rut or a very deep ditch, as the automobile must respond when the axle rotates and the cable is wound upon the pulley.

What is claimed is:

A wheel attachment of the character described comprising a body member having a socket for the reception of a wheel hub, spaced flanges projecting from the ends of the body member, said flanges cooperating with the periphery of the body member to form a pulley, means extending through the periphery at one end of the body member for securing the body member to an axle, means extending through said end of the body member in angular relation to the first mentioned means for securing said end to the hub of the wheel, and means for connecting the cable to the pulley portion of the body member.

In testimony whereof I hereunto affix my signature.

WALTER H. GREEN.